United States Patent
Poon et al.

(10) Patent No.: US 7,985,346 B2
(45) Date of Patent: Jul. 26, 2011

(54) METHOD FOR PREVENTING FENCING DURING PROCESS OF FORMING AN AIR-BEARING SURFACE ON A SLIDER SUBSTRATE

(75) Inventors: SikWing Poon, Hong Kong (CN); Hui Yin, Dongguan (CN); YongPing Yang, Dongguan (CN); ZeQing Jin, Dongguan (CN)

(73) Assignee: SAE Magnetic (H.K.) Ltd., Hong Kong (CN)

( * ) Notice: Subject to any disclaimer, the term of this patent is extended or adjusted under 35 U.S.C. 154(b) by 736 days.

(21) Appl. No.: 12/081,698

(22) Filed: Apr. 18, 2008

(65) Prior Publication Data

US 2009/0261061 A1 Oct. 22, 2009

(51) Int. Cl.
*B44C 1/22* (2006.01)
(52) U.S. Cl. .............. 216/22; 438/3; 29/603.07
(58) Field of Classification Search ........... 216/22; 438/3; 29/603.07, 603.14, 603.16
See application file for complete search history.

(56) References Cited

U.S. PATENT DOCUMENTS

| 6,712,984 B2* | 3/2004 | Sasaki | 216/22 |
| 7,211,195 B2* | 5/2007 | Cyrille et al. | 216/22 |

* cited by examiner

*Primary Examiner* — Roberts Culbert
(74) *Attorney, Agent, or Firm* — Nixon & Vanderhye PC

(57) ABSTRACT

The invention provides a method for preventing fencing during process of forming an ABS on a slider substrate includes the steps of: (a) providing a slider substrate having a photo-resist covered thereon, the photo-resist having a plurality of trenches developed thereon, the plurality of trenches collectively defining an air bearing surface pattern, the plurality of trench each having at least a non-vertical sidewall, the at least non-vertical sidewall including a zigzag-shaped edge adjoining the slider substrate; (b) etching the photo-resist by oxygen ions, such that the zigzag-shaped edge is trimmed to be a straight edge and the at least non-vertical sidewall is trimmed to be a vertical sidewall; and (c) etching the slider substrate exposed from the trenches such that a fencing-free air-bearing surface is formed on the slider substrate.

8 Claims, 7 Drawing Sheets

---

Providing a slider substrate having a photo-resist covered thereon, the photo-resist having trenches developed thereon, these trenches collectively defining an air bearing surface pattern, at least a trench having at least a sidewall which includes an irregular edge adjoining the slider substrate — 301

Etching the photo-resist by oxygen ions with etching voltage of more than 400v and current flux density of more than 0.005 mA/mm2, such that the irregular edge is trimmed to be a regular edge — 302

Etching the slider substrate beneath the trenches such that an air-bearing surface is formed on the slider substrate — 303

METHOD FOR PREVENTING FENCING DURING PROCESS OF FORMING AN AIR-BEARING SURFACE ON A SLIDER SUBSTRATE

FIELD OF THE INVENTION

The present invention relates to a method for manufacturing a slider, and more particularly, to a method for preventing fencing during process of forming an air-bearing surface on a slider substrate.

BACKGROUND OF THE INVENTION

One known type of information storage device is a disk drive device that uses magnetic media to store data and a movable read/write head that is positioned over the media to selectively read data from or write data to the media.

Figure 1A:
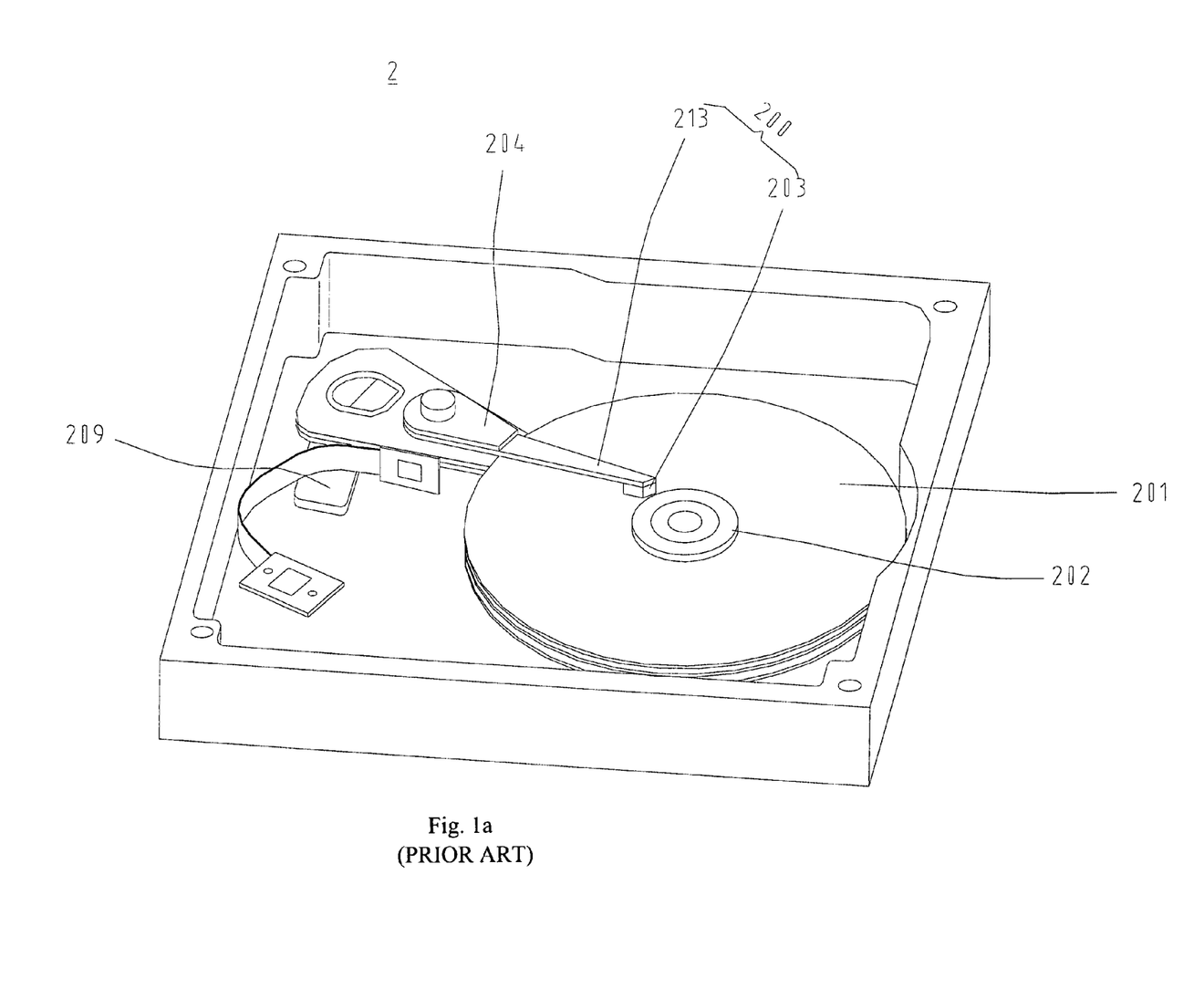
FIG. 1a is a perspective view of a conventional disk drive device.

FIG. 1a illustrates a typical disk drive device 2. A magnetic disk 201 is mounted on a spindle motor 202 for spinning the disk 201. A voice coil motor arm 204 carries a head gimbal assembly (HGA) 200 that includes a slider 203 incorporating a read/write head and a suspension 213 to support the slider 203. A voice-coil motor (VCM) 209 is provided for controlling the motion of the motor arm 204 and, in turn, controlling the slider 203 to move from track to track across the surface of the disk 201. In operation, a lift force is generated by the aerodynamic interaction between the slider 203 and the spinning magnetic disk 201, such that the voice coil motor arm 204 maintains a predetermined flying height above the surface of the magnetic disk 201.

Figure 1B:
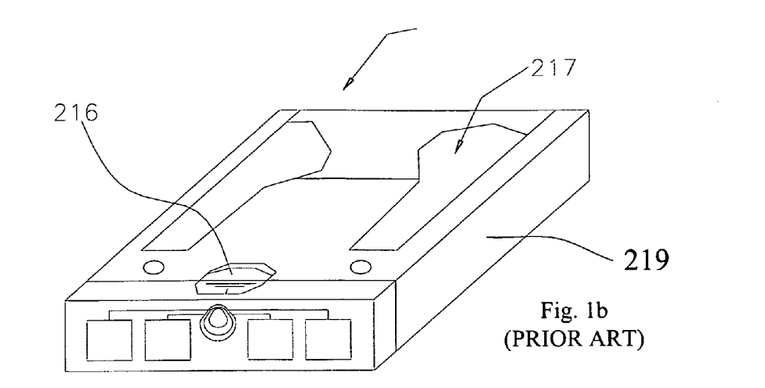

FIG. 1b shows a perspective view of the slider of FIG. 1a. As illustrated, the slider 203 includes a substrate 219 which constitutes main body thereof. An air-bearing surface (ABS) 217 is defined on one surface of the substrate 219. Besides, a read/write head 216 is formed on the ABS 217 adjacent one edge of the substrate 219. In the industry, the ABS 217 is formed on the substrate 219 by photolithography and etching process and this will be described below.

Figure 2A:
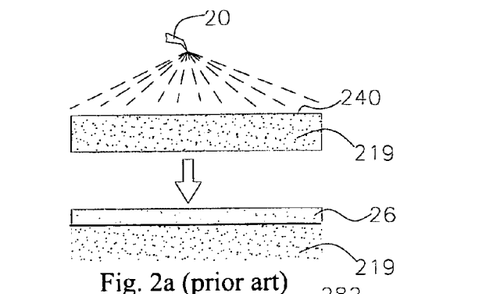
FIGS. 2a-2e show a series of views for illustrating a conventional photolithography and etching process for forming an ABS on a slider substrate.
Figure 2B:
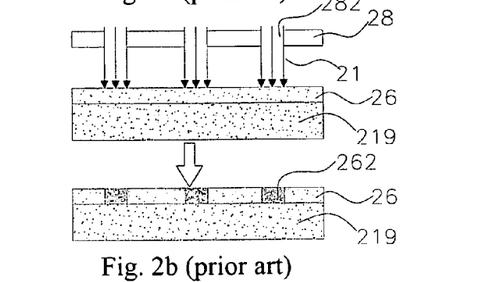
Figure 2C:
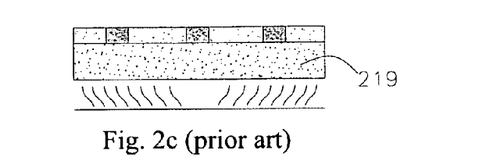
Figure 2D:
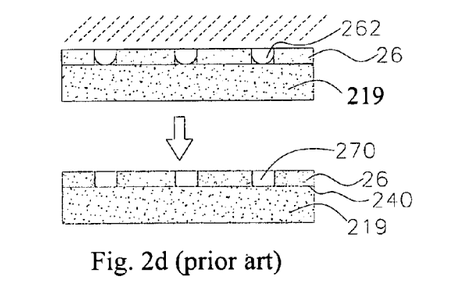
Figure 2E:
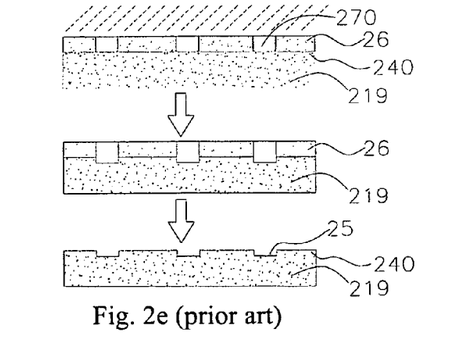

Referring to FIG. 2a, at first, the substrate 219 is coated with a layer of photo-resist 26 on its top surface 240 via a dispenser 20. Then, the photo-resist 26 covered on the substrate 219 is exposed to a light beam 21 through ABS pattern holes 282 of a photo-mask 28, such that ABS pattern is accurately transferred to the photo-resist 26 (exposed regions 262 formed on the photo-resist 26 collectively constitute the ABS pattern), as shown in FIG. 2b. Next, as shown in FIG. 2c, the substrate 219 along with the photo-resist is baked for a period of time so that polymerization reacts sufficiently. After that, a developing procedure is implemented so as to remove the exposed regions away from the photo-resist 26, thereby trenches 270 being defined in the photo-resist 26 and partial material of the substrate 219 at the top surface 240 being exposed outside from these trenches 270, as shown in FIG. 2d. Finally, as shown in FIG. 2e, ion-milling or reactive ion etching process is performed to remove partial material of the substrate 219 exposed outside from the trenches 270 at the top surface 240, thus recesses 25 being formed on the top surface 240 of the substrate 219. These recesses 25 collectively define an ABS on the substrate 219. At last, the residual photo-resist 26 is stripped off the top surface 240, hence finishing the whole ABS forming process.

Figure 3A:
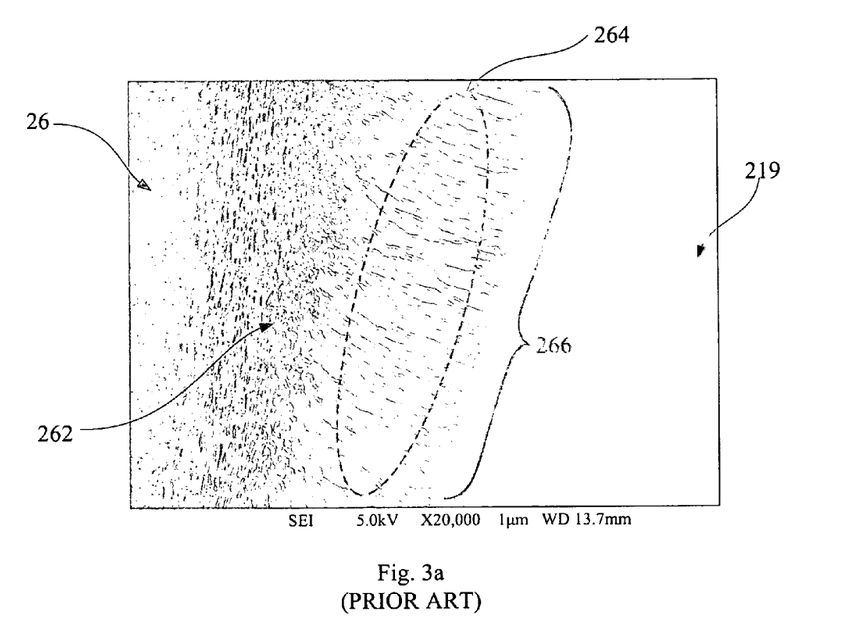
FIG. 3a shows a photography taken by scanning electron microscope (SEM) for illustrating irregularity of edge and footing structure caused by the conventional slider ABS forming process shown in FIGS. 2a-2e.
Figure 3B:
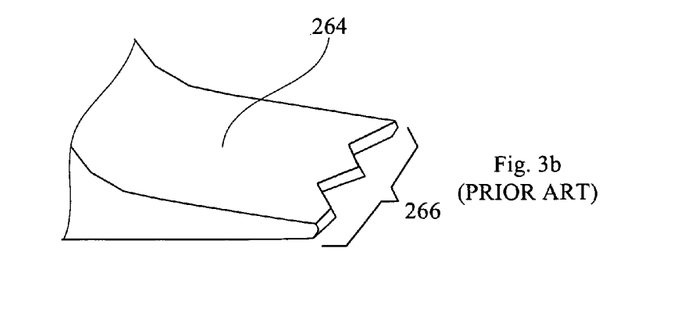
FIG. 3b shows a schematic view of a photo-resist at its edge portion for illustrating irregularity of edge and footing structure caused by the conventional slider ABS forming process shown in FIGS. 2a-2e.

During above slider ABS forming process, some problems arise. More specifically, due to limitation of technology, smoothness of the top surface of the slider substrate is generally low. Consequently, after the photo-resist is exposed and trenches are formed therein, edges of the trenches adjoining the top surface of the substrate will not be rigidly straight lines; on the contrary, they will become irregular in shape. For example, as shown in FIGS. 3a-3b, an irregular edge 266, for example a zigzagged edge of a sidewall 262 of a trench of a photo-resist 26 is produced at a location adjacent the substrate 219.

Figure 4A:
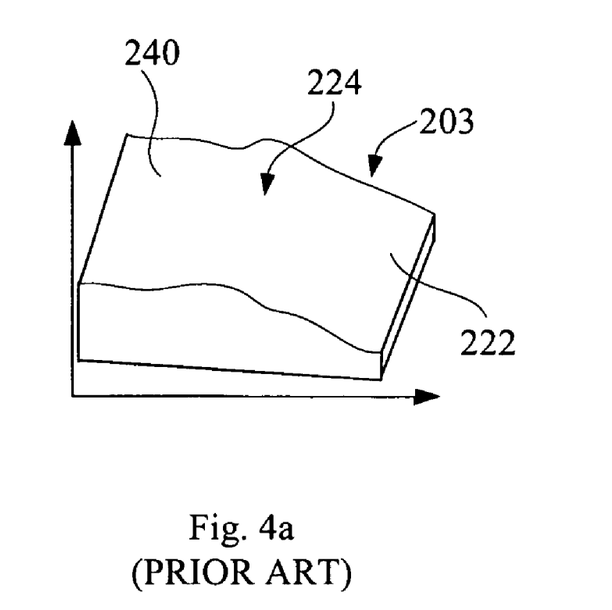
FIG. 4a shows a photography of part of a slider taken by SEM for illustrating fencing structure formed on a slider ABS and caused by the conventional slider ABS forming process shown in FIGS. 2a-2e.
Figure 4B:
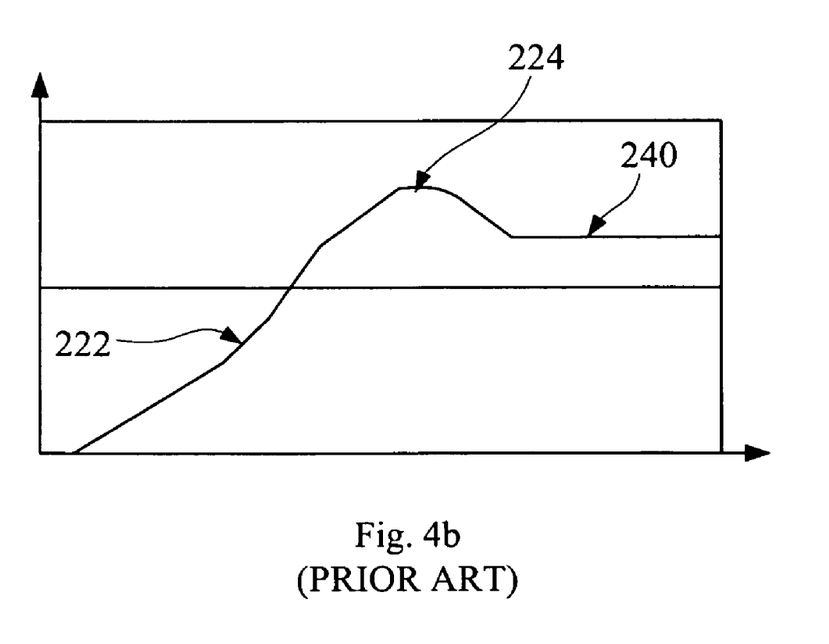
FIG. 4b shows a side profile of the slider of FIG. 4a for demonstrating fencing structure higher than the ABS of the slider.

When performing subsequent ion milling/reactive ion etching process, the irregular edge 266 will cause re-deposition of substrate material on the substrate at location near the edge 266. In other words, substrate material at the location near the edge 266 will not be etched away as would be desired; adversely, it will be deposited once again on that location and as a bad result, fencing structure (re-deposition), which is higher than top surface of the substrate, is produced after the etching process is finished. As illustrated in FIGS. 4a-4b, a fencing region 224, which is higher than a top surface 240 of a slider 203 and adjacent a sidewall 222 of a recess (not labeled), is formed during etching process. The fencing structure negatively influences performances of the entire disk drive unit. For example, it will become difficult to further reduce flying height of the slider for achieving much larger data storage capability; moreover, the fencing structure will inevitably increase probability of scratches on the slider and/or disk, and in some extreme situations, this will result in serious crash of the disk.

On the other hand, during the photo-resist exposure process described above, because some light beam may be reflected from top surface of the substrate and scattered back into the photo-resist, polymerization reaction speed will be decreased gradually from top to bottom of the photo-resist, thus insufficient polymerization occurring at bottom of the photo-resist. As a result, when the photo-resist is developed, the sidewalls of the trenches are non-vertical, also known as "footing" (e.g. footing region 264 shown in FIGS. 3a-3b). Consequently, the ABS pattern in the photo-resist that is subsequently transferred to the substrate is not the desired pattern, but will have errors resulting from the photo-resist footing. For example, as shown in FIGS. 4a-4b, a sidewall 222 of a slider 203 is non-vertical due to reasons discussed above. This will cause bad dimension accuracy for the ABS thus formed, thereby degrading flying performance of the slider.

Therefore, there is a need for an improved design to overcome the prior art drawbacks.

SUMMARY OF THE INVENTION

One aspect of the present invention is to provide a method for preventing fencing during forming an ABS on a slider substrate, thereby preventing formation of fencing structure, and in turn, making it possible to further reduce flying height of a slider and improve data storage capability of a disk drive unit. In addition, risk of scratches between the slider and disk is also decreased.

Another aspect of the present invention is to provide a method for preventing fencing during forming an ABS on a slider substrate, which can reduce or even completely eliminate footing structure during photo-resist exposure and development processes, and thereby further improving dimension accuracy of the ABS of the slider.

To achieve above objects, a method for preventing fencing during process of forming an ABS on a slider substrate includes the steps of: (a) providing a slider substrate having a photo-resist covered thereon, the photo-resist having a plurality of trenches developed thereon, the plurality of trenches collectively defining an air bearing surface pattern, the plurality of trench each having at least a non-vertical sidewall, the at least non-vertical sidewall including a zigzag-shaped edge adjoining the slider substrate; (b) etching the photo-resist by oxygen ions, such that the zigzag-shaped edge is trimmed to be a straight edge and the at least non-vertical sidewall is trimmed to be a vertical sidewall; and (c) etching the slider substrate exposed from the trenches such that a fencing-free air-bearing surface is formed on the slider substrate.

Preferably, the oxygen ions used in the step (b) has an etching voltage of more than 400 v and current flux density of more than 0.005 mA/mm². These parameter selections can more effectively facilitate to trim the zigzag-shaped edge to straight edge. In addition, they facilitate formation of more vertical sidewall.

The incident angle of the oxygen ions are zero degree, i.e., the oxygen ions are incident perpendicular to the photo-resist surface so as to expedite etching speed thereof. In addition, the oxygen ions may be produced by ionizing oxygen gas.

The slider substrate may be etched by ion-milling or reactive ion etching means or other suitable etching means. Moreover, these etching ions may be generated by inert gas for example Argon gas. Alternatively, the method of the invention may also include an additional photo-resist stripping step after the slider substrate is completely etched.

Compared with conventional method, since a high power oxygen ion etching process is implemented prior to actually etching the slider substrate, irregular, such as zigzag-shaped edges of sidewalls of trenches defined in the photo-resist by development are effectively trimmed to be regular, i.e., more straight edges and footing of the sidewalls are reduced or even completely eliminated. Consequently, after the slider substrate is finally etched, a fencing-free ABS with more vertical sidewalls will be readily formed.

For the purpose of making the invention easier to understand, several particular embodiments thereof will now be described with reference to the appended drawings in which:

BRIEF DESCRIPTION OF THE DRAWINGS

FIG. 1b is a perspective view of a slider of the disk drive device shown in FIG. 1a;

DETAILED DESCRIPTION OF ILLUSTRATED EMBODIMENTS

As will be discussed below, the invention provides a method for effectively preventing fencing structure during process of forming an ABS on a slider substrate. According to the method, prior to actually etching the slider substrate, a high power oxygen ion etching process is implemented in order that irregular edges of sidewalls of trenches defined in the photo-resist by development are trimmed to be regular edges (more straight line edges) and footing of the sidewalls are reduced or even completely eliminated. Consequently, after the slider substrate is finally etched, a fencing-free ABS with more vertical sidewalls will be readily formed.

Figure 5:
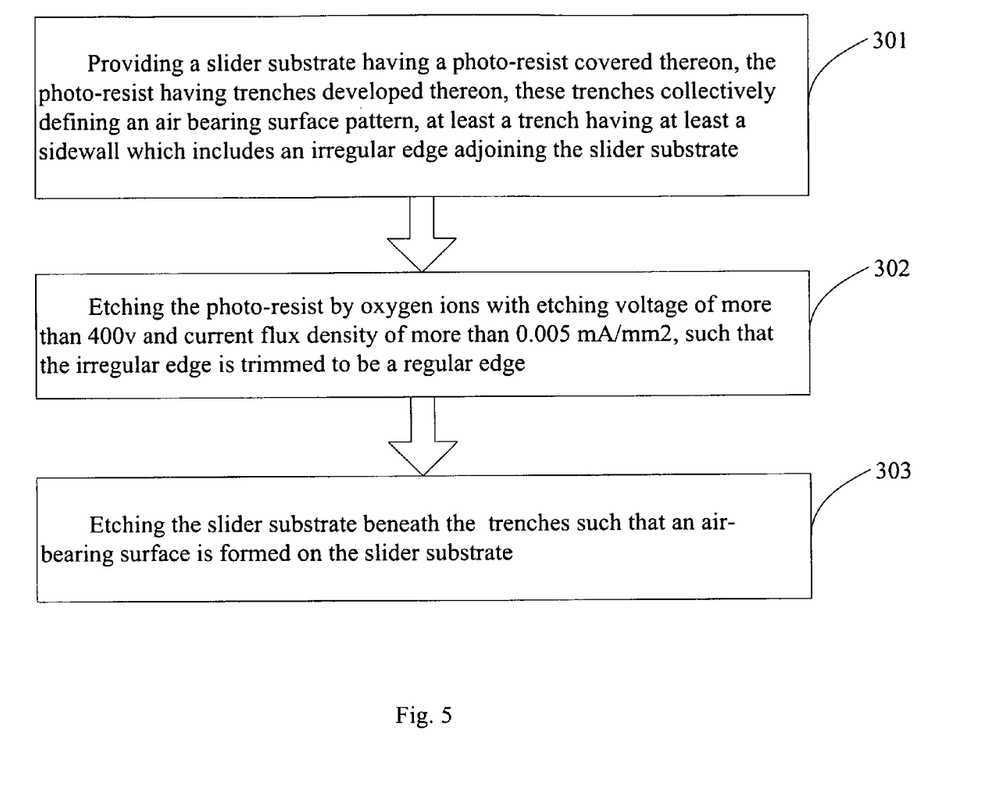
FIG. 5 shows a flowchart illustrating a method for preventing fencing during process of forming an ABS on a slider substrate according to an embodiment of the invention.

According to an embodiment, as shown in FIG. 5, the method comprises the following steps: firstly, providing a slider substrate having a photo-resist covered thereon, the photo-resist having a plurality of trenches developed thereon, the plurality of trenches collectively defining an air bearing surface pattern, the plurality of trench each having at least a non-vertical sidewall, the at least non-vertical sidewall including a zigzag-shaped edge adjoining the slider substrate (step 301); then, etching the photo-resist by oxygen ions, such that the zigzag-shaped edge is trimmed to be a straight edge and the at least non-vertical sidewall is trimmed to be a vertical sidewall (step 302); finally, etching the slider substrate exposed from the trenches such that a fencing-free air-bearing surface is formed on the slider substrate (step 303).

Preferably, the oxygen ions used in the step (302) may have an etching voltage of more than 400 v and current flux density of more than 0.005 mA/mm². These parameter selections can more effectively facilitate to trim the zigzag-shaped edge to straight edge. In addition, they facilitate formation of more vertical sidewall.

Preferably, in step 302, the oxygen ions are generated by ionizing oxygen gas. In addition, to enhance the oxygen ion etching speed, the incident angle of the oxygen ions maybe set to be zero degree, that is, the incident oxygen ions are perpendicular to the photo-resist surface. Furthermore, in step 303, the etching process may be ion-milling (IM) or reactive ion etching (RIE). The ions used in this step 303 are preferably ions generated by inert gas, for example Argon gas. It is also preferable to add an additional step of stripping the residual photo-resist remained on the slider substrate after the slider substrate is completely etched in step 303.

During oxygen ion etching process (step 302), a little amount of photo-resist material exposed to the oxygen ions is etched away. Because the irregular, such as zigzag-shaped edge of the photo-resist is much thinner than the rest thereof, oxygen ion etching will have more influence on the edge than the rest of the photo-resist. Namely, portion of the irregular edge is adequately etched so as to become a regular edge (more straight edge line), while the rest of the photo-resist is etched away with a little material. In other words, the rest of the photo-resist will have little changes in topography whereby maintaining its original dimension characteristics.

Figure 6:
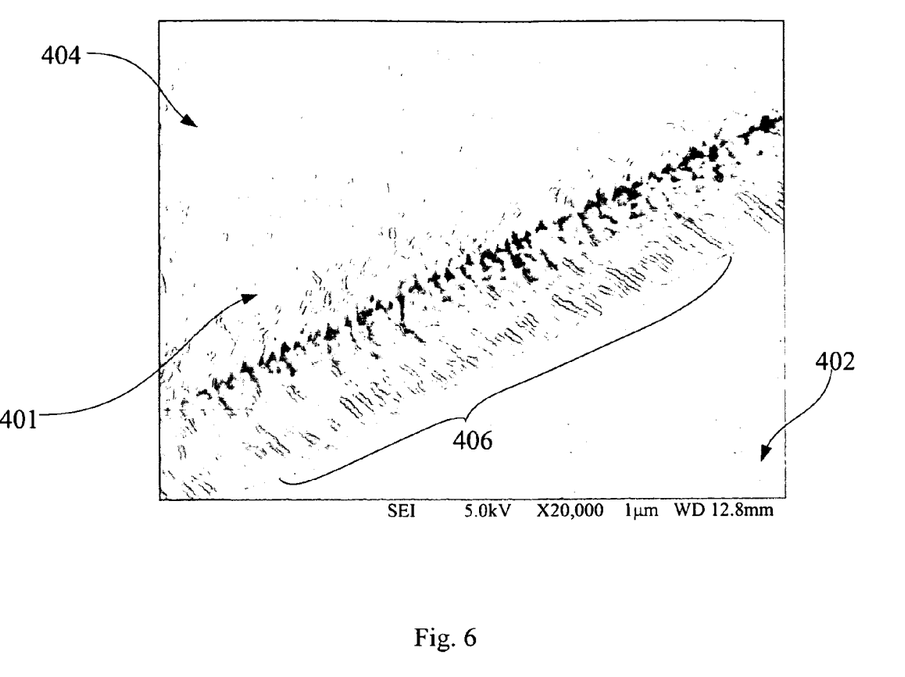
FIG. 6 shows a photography obtained by SEM for showing a straight (regular) edge of a sidewall of a photo-resist according to the method of FIG. 5.
Figure 7A:
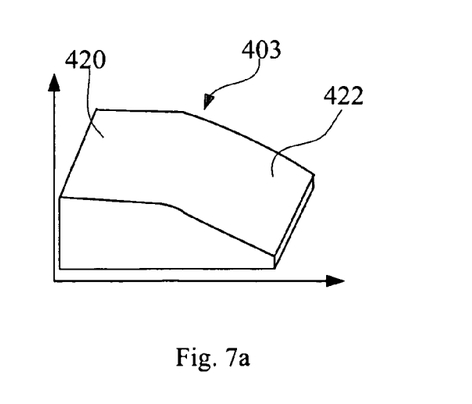
FIG. 7a shows a photography of part of a slider obtained by SEM for illustrating a fencing-free slider ABS formed by the method of FIG. 5.
Figure 7B:
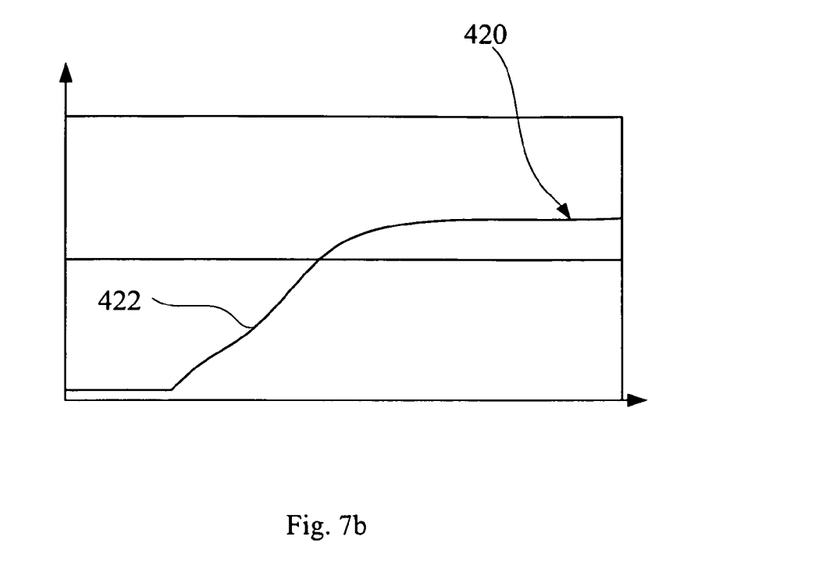
FIG. 7b shows a side profile of the slider of FIG. 7a for illustrating a fencing-free ABS formed by the method shown of FIG. 5.

FIG. 6 shows a photography obtained by scanning electron microscope (SEM) after a photo-resist is etched by oxygen ion during step 302 of the method. As shown, an edge 406 of a sidewall 401 of a photo-resist 404 adjoins a slider substrate 402. It is apparent, when compared with the irregular edge 266 (as shown in FIGS. 3a-3b) caused by a conventional slider ABS forming method, that the edge 406 of the invention gets more regular (straighter) than the edge 266. Resultantly, when the slider substrate 402 is etched by ions in order to form an ABS thereon, no re-deposition (fencing) will occur and therefore, the finally processed slider substrate will be free of fencing structure. For example, as shown in FIGS. 7a-7b, no fencing structure exists between a substrate surface 420 of a slider 403 and a sidewall 422 (part of an ABS).

Figure 8:
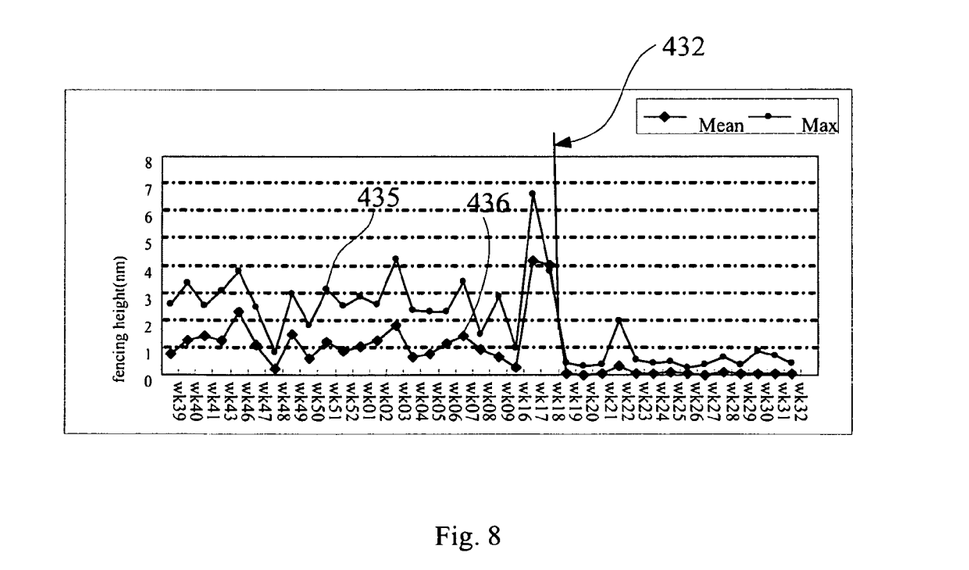
FIG. 8 shows a diagram presenting fencing height changes before and after application of the method of the invention.

Referring to FIG. 8, curve 435 represents max fencing height (unit: nm) against time (unit: week), while curve 436 represents mean fencing height against time. Vertical line 432 represents a critical time point (at the 19$^{th}$ week) and from this week on, the method of the invention is applied. As observed from the figure, both curves become approximately flat and near to zero from line 432 to right ends thereof, that is, the fencing height is greatly reduced when applying the method of the invention.

In an embodiment, the average fencing height according to the invention is 0.2 nm, whilst that caused by a conventional method is about 3 nm, proving that the method of the invention effectively reduces the undesirable fencing height. As to media consumption rate (MCR) of a disk drive device, a disk drive device incorporating a slider made according to the method of the invention gets only 0.1% of MCR, while a disk drive device incorporating a slider made according to a conventional method gets a large MCR of 5%, meaning that a bigger media consumption is caused for a conventional disk drive device. Small MCR can prolong life span of a disk drive device, and therefore, the method of the invention also prolongs life span of a disk drive device due to smaller MCR value.

Additionally, the oxygen ion etching procedure of the method also brings an advantage of getting more vertical sidewalls for the photo-resist. More specifically, the oxygen ion etching will trim the sidewalls of the photo-resist so that footing generated on the sidewalls will be diminished. As a result, after the slider substrate is finally etched, an ABS with more vertical sidewalls will be obtained. In other words, an ABS of bigger dimension accuracy will be realized. This certainly will improve flying performance of the slider.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A method for preventing fencing during process of forming an air-bearing surface on a slider substrate, comprising the steps of:
    (a) providing a slider substrate having a photo-resist covered thereon, the photo-resist having a plurality of trenches developed thereon, the plurality of trenches collectively defining an air bearing surface pattern, the plurality of trench each having at least a non-vertical sidewall, the at least non-vertical sidewall including a zigzag-shaped edge adjoining the slider substrate;
    (b) etching the photo-resist by oxygen ions, such that the zigzag-shaped edge is trimmed to be a straight edge and the at least non-vertical sidewall is trimmed to be a vertical sidewall; and
    (c) etching the slider substrate exposed from the trenches such that a fencing-free air bearing surface is formed on the slider substrate.

2. The method according to claim 1, wherein the oxygen ions used in the step (b) has an etching voltage of more than 400V and current flux density of more than 0.005 mA/mm$^2$.

3. The method according to claim 1, wherein the incident angle of oxygen ions is zero degree.

4. The method according to claim 1, wherein the slider substrate is etched by ion-milling or reactive ion etching method.

5. The method according to claim 1, wherein further comprising a photo-resist stripping step after the step (c).

6. The method according to claim 1, wherein the oxygen ions are generated by ionizing oxygen gas.

7. The method according to claim 6, wherein the ions used in step (c) are ions generated by inert gas.

8. The method according to claim 6, wherein the ions used in the step (c) are generated by Argon gas.

* * * * *